US 6,728,079 B2

(12) United States Patent
Shimazawa

(10) Patent No.: US 6,728,079 B2
(45) Date of Patent: Apr. 27, 2004

(54) MAGNETORESISTIVE EFFECT THIN-FILM MAGNETIC HEAD

(75) Inventor: Koji Shimazawa, Tokyo (JP)

(73) Assignee: TDK Corporation, Tokyo (JP)

( * ) Notice: Subject to any disclaimer, the term of this patent is extended or adjusted under 35 U.S.C. 154(b) by 118 days.

(21) Appl. No.: 09/899,935

(22) Filed: Jul. 9, 2001

(65) Prior Publication Data

US 2002/0048126 A1 Apr. 25, 2002

(30) Foreign Application Priority Data

Jul. 10, 2000 (JP) .......................... 2000-208402

(51) Int. Cl.$^7$ ................................. G11B 5/39
(52) U.S. Cl. ........................................ 360/320
(58) Field of Search .................. 360/319, 320, 360/321

(56) References Cited

U.S. PATENT DOCUMENTS

| | | | | |
|---|---|---|---|---|
| 5,583,726 A | * | 12/1996 | Mizoshita et al. | .......... 360/321 |
| 5,696,656 A | * | 12/1997 | Gill et al. | ................ 360/319 |
| 5,828,530 A | * | 10/1998 | Gill et al. | ................ 360/319 |
| 6,046,890 A | * | 4/2000 | Yamada et al. | ............. 360/320 |
| 6,381,107 B1 | * | 4/2002 | Redon et al. | ............... 360/321 |

FOREIGN PATENT DOCUMENTS

JP 04103014 4/1992

OTHER PUBLICATIONS

Koshikawa et al. "Flux–Guided MR Head for Very Low Flying Height". IEEE Transactions on Magnetics. vol. 30. No. 6. Nov. 1994. pp. 3840–3842.*
W.P. Pratt, Jr., et al., "Perpendicular Giant Magnetoresistance of Ag/Co Multilayers", Physical Review Letters, vol. 66, No. 23, Jun. 10, 1991, pp. 3060–3063.

* cited by examiner

Primary Examiner—George J. Letscher
Assistant Examiner—C R Beachan
(74) Attorney, Agent, or Firm—Burns, Doane, Swecker & Mathis, L.L.P.

(57) ABSTRACT

An MR thin-film magnetic head includes a lower shield layer, an MR multilayer laminated on the lower shield layer, in the MR multilayer, a current flowing in a direction perpendicular to surfaces of layers of the MR multilayer, an upper gap layer made of a nonmagnetic electrically conductive material and laminated on the MR multilayer, an insulation gap layer made of insulation material and formed between the lower shield layer and the upper gap layer, and an upper shield layer laminated on the upper gap layer. A thickness of the insulation gap layer is larger than that of the upper gap layer.

14 Claims, 7 Drawing Sheets

MAGNETORESISTIVE EFFECT THIN-FILM MAGNETIC HEAD

FIELD OF THE INVENTION

The present invention relates to a magnetoresistive effect (MR) thin-film magnetic head that is applicable to a hard disk drive (HDD) apparatus and provided with a tunnel magnetoresistive effect (TMR) element or a current perpendicular to the plane giant magnetoresistive effect (CPP-GMR) element, in which a current flows in a direction perpendicular to surfaces of layers.

DESCRIPTION OF THE RELATED ART

Recently, in order to satisfy the demand for higher recording density in an HDD apparatus, higher sensitivity and larger output of a thin-film magnetic head are required. A TMR element and a CPP-GMR element meet these requirements and are beginning to receive attention. The TMR element, disclosed in Japanese patent publication No. 04103014A for example, utilizes a ferromagnetic tunnel effect and has a multi-layered structure including a lower ferromagnetic thin-film layer, a tunnel barrier layer and an upper ferromagnetic thin-film layer. The CPP-GMR element is one type of GMR element of a multi-layered structure including a lower ferromagnetic thin-film layer, a nonmagnetic metal layer and an upper ferromagnetic thin-film layer. In the CPP-GMR element, however, a current flows in a direction perpendicular to the surfaces of laminated layers. Such CPP-GMR element is disclosed in, for example, W. P. Pratt, Jr. et al., "Perpendicular Giant Magnetoresistance of Ag/Co Multilayer," PHYSICAL REVIEW LETTERS, Vol. 66, No. 23, pp.3060–3063, June 1991.

These elements not only offer MR ratios several times greater than that of a general GMR element such as CIP (Current-In-Plane)-GMR element in which a current flows along the surface of layers, but also implements narrow gaps between layers without difficulty. The terms "lower" in "lower ferromagnetic thin-film layer" and "upper" in "upper ferromagnetic thin-film layer" are selectively used depending on the position of the layer relative to the substrate. In general, a layer is "lower" if this layer is close to the substrate, and "upper" if the layer is away from the substrate.

FIG. 1 illustrates a CIP-GMR element with a conventional structure seen from an air bearing surface (ABS).

In the figure, reference numeral 10 denotes a lower shield layer, 11 denotes a lower shield gap layer made of an insulation material, 12 denotes a GMR multilayer consisting of a lower ferromagnetic thin-film layer (free layer)/a nonmagnetic metal layer/an upper ferromagnetic thin-film layer (pinned layer)/an anti-ferromagnetic thin-film layer, 13 denotes an upper shield gap layer formed of an insulation material, 14 denotes an upper shield layer, 15 denotes hard bias layers, and 16 denotes electrode layers, respectively.

A sense current flows in parallel to the surfaces of the layers of the GMR multilayer 12. The GMR multilayer 12 are insulated from the lower shield layer 10 by the lower shield gap layer 11, and from the upper shield layer 14 by the upper shield gap layer 13.

In order to narrow the gap of such a CIP-GMR element more, the lower and upper shield gap layers 11 and 13 are required to be formed of a very thin insulating material with a very high dielectric strength. However, such an insulating material is difficult to make and has been the bottleneck for providing a CIP-GMR element used in a high density HDD apparatus.

FIG. 2 illustrates a TMR element or a CPP-GMR element with a conventional structure, seen from the ABS.

In the figure, reference numeral 20 denotes a lower shield layer also serving as an electrode, 21 denotes a lower gap layer made of a metal material, which also serves as an electrode, 22 denotes a TMR layer with a multi-layered structure consisting of a lower ferromagnetic thin-film layer (free layer)/a tunnel barrier layer/an upper ferromagnetic thin-film layer (pinned layer)/an anti-ferromagnetic thin-film layer, or CPP-GMR layer with a multi-layered structure consisting of a lower ferromagnetic thin-film layer (free layer)/a nonmagnetic metal layer/an upper ferromagnetic thin-film layer (pinned layer)/an anti-ferromagnetic thin-film layer, 23 denotes an upper gap layer made of a metal material, which also serves as an electrode, 24 denotes an upper shield layer also serving as an electrode, 25 denotes hard bias layers, and 26 denotes an insulation gap layer made of an insulating material, respectively. Reference numeral 22a denotes extended parts of the lower ferromagnetic thin-film layer (free layer) extending from the TMR multilayer or the CPP-GMR multilayer to the hard bias layers 25 along the surfaces of layers of the TMR multilayer or the CPP-GMR multilayer.

The TMR element or CPP-GMR element is electrically connected between the lower shield layer 20 and the upper shield layer 24 so that a sense current flows in a direction perpendicular to the surfaces of the layers. Therefore, a narrow gap can be implemented without inviting dielectric breakdown of the gap layer. As a result, the line recording density can be greatly improved.

The important features required for an HDD apparatus are not only high recording density but also high data transfer rate. The transfer rate greatly relies on the rotational speed of a magnetic disk as well as the frequency characteristics of a write head and a read head.

FIG. 3 shows an equivalent circuit of the CIP-GMR element, and FIG. 4 shows an equivalent circuit of the TMR element or the CPP-GMR element.

As is apparent from FIG. 3, the CIP-GMR element has only an equivalent resistance $R_{GMR}$ of the GMR element across the output terminals and no other essential factor that may deteriorate its frequency characteristics. However, as shown in FIG. 4, the TMR element or the CPP-GMR element that utilizes the shield layers as the electrodes has not only an equivalent resistance $R_{TMR}$ of the TMR element or the CPP-GMR element across their output terminals but also a capacitance $C_{shield}$ between the shield layers and a capacitance $C_{TMR}$ of the TMR element or the CPP-GMR element itself across their output terminals. These resistance $R_{TMR}$ and capacitances $C_{TMR}$ and $C_{shield}$ form a low-pass filter causing serious deterioration of the frequency characteristics.

SUMMARY OF THE INVENTION

It is therefore an object of the present invention to provide an MR thin-film magnetic head having a TMR element or a CPP-GMR element for example, whereby the frequency characteristics of the MR thin-film magnetic head can be greatly improved.

According to the present invention, an MR thin-film magnetic head includes a lower shield layer, an MR multilayer laminated on the lower shield layer, in the MR multilayer, a current flowing in a direction perpendicular to surfaces of layers of the MR multilayer, an upper gap layer made of a nonmagnetic electrically conductive material and laminated on the MR multilayer, an insulation gap layer made of insulation material and formed between the lower shield layer and the upper gap layer, and an upper shield layer laminated on the upper gap layer. A thickness of the insulation gap layer is larger than that of the upper gap layer.

Also, according to the present invention, an MR thin-film magnetic head includes a lower shield layer, a lower gap layer made of a nonmagnetic electrically conductive material and laminated on the lower shield layer, an MR multilayer laminated on the lower gap layer, in the MR multilayer, a current flowing in a direction perpendicular to surfaces of layers of the MR multilayer, an upper gap layer made of a nonmagnetic electrically conductive material and laminated on the MR multilayer, an insulation gap layer made of an insulation material and formed between the lower shield layer and the upper gap layer, and an upper shield layer laminated on the upper gap layer. A thickness of the insulation gap layer is larger than that of the upper gap layer.

In case of CIP-GMR head, it is common sense to locate a CIP-GMR multilayer at the center of gap between lower and upper shield layers from the viewpoint of insulation strength. Contrary to this, in case of CPP-GMR head or TMR head in which a current flows in a direction perpendicular to surfaces of layers, there occurs no problem even if its conductive gap layer is thinned. Thus, according to the present invention, the thickness of the insulation gap layer is made larger than that of the upper gap layer so as to thicken the insulation gap layer. As a result, the capacitance $C_{shield}$ between the lower shield layer and the upper shield layer decreases to extremely improve the frequency characteristics of the thin-film magnetic head.

FIG. 5 illustrates a head output versus frequency characteristic when the capacitance $C_{shield}$ between the shield layers in the equivalent circuit of FIG. 4 is 6 pF, and FIG. 6 illustrates a head output versus frequency characteristic when the capacitance $C_{shield}$ between the shield layers in the equivalent circuit of FIG. 4 is 1 pF. It is assumed that the capacitance $C_{TMR}$ of the TMR element or CPP-GMR element itself is 0.01 pF and the load connected across the output terminals is 10 MΩ.

As will be understood from FIG. 5, when the capacitance $C_{shield}$ between the shield layers is 6 pF, the cut-off frequency fc at which the output decreases by 3 dB decreases as the resistance $R_{TMR}$ increases. In order to achieve fc>500 MHz, the resistance $R_{TMR}$ should be less than 50 Ω. This frequency of 500 MHz is an expected frequency to be used at a record density of about 100 Gbits/in$^2$. For TMR or CPP-GMR elements with a recording density of 100 Gbits/in$^2$ or more, it is very difficult to implement such a low resistance value.

Contrary to this, as shown in FIG. 6, when the capacitance $C_{shield}$ between the shield layers is 1 pF, even if the resistance $R_{TMR}$ is higher than 300 Ω, the cut-off frequency fc can be fc>500 MHz. For the resistance $R_{TMR}$ higher than 300 Ω that is a sufficiently realizable value, the frequency characteristic of the thin-film magnetic head can be greatly improved by making the capacitance $C_{shield}$ between the shield layers smaller. The capacitance $C_{TMR}$ of the TMR element or CPP-GMR element itself is much smaller than the capacitance $C_{shield}$ between the shield layers (less than one tenth), and therefore can be of little or no problem.

In order that the thickness of the insulation gap layer becomes larger than that of the upper gap layer, it is preferred that a lower gap layer made of a nonmagnetic electrically conductive material and provided with a large thickness is formed under the MR multilayer.

In order that the thickness of the insulation gap layer becomes larger than that of the upper gap layer, it is also preferred that the MR multilayer has a large thickness. In this case, preferably, the MR multilayer has an antiferromagnetic layer with a large thickness.

It is further preferred that a ratio $TH_{G2}/TH_{G1}$ of a thickness $TH_{G2}$ of the upper gap layer and a thickness $TH_{G1}$ of the insulation gap layer is more than 1/5 to improve the output characteristics of the thin-film magnetic head.

The MR multilayer is preferably a TMR multilayer including a tunnel barrier layer and a pair of ferromagnetic thin-films between which the tunnel barrier is sandwiched, or a CPP-GMR multilayer including a nonmagnetic metal layer, and a pair of ferromagnetic thin-films between which the nonmagnetic metal layer is sandwiched.

Further objects and advantages of the present invention will be apparent from the following description of preferred embodiments of the invention as illustrated in the accompanying drawings.

BRIEF DESCRIPTION OF THE DRAWINGS

FIG. 7b shows a B—B line sectional view of FIG. 7a;

DESCRIPTION OF THE PREFERRED EMBODIMENTS

Figure 1:
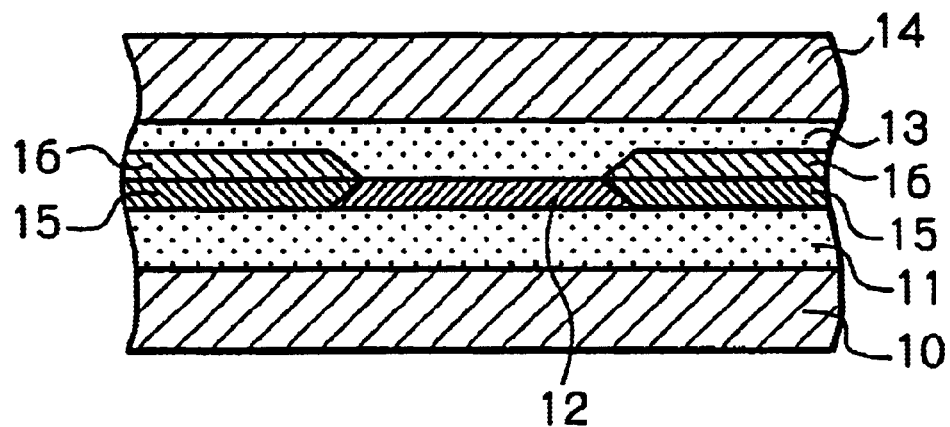
FIG. 1 already disclosed shows a sectional view illustrating a CIP-GMR element with a conventional structure seen from a direction of ABS.
Figure 2:
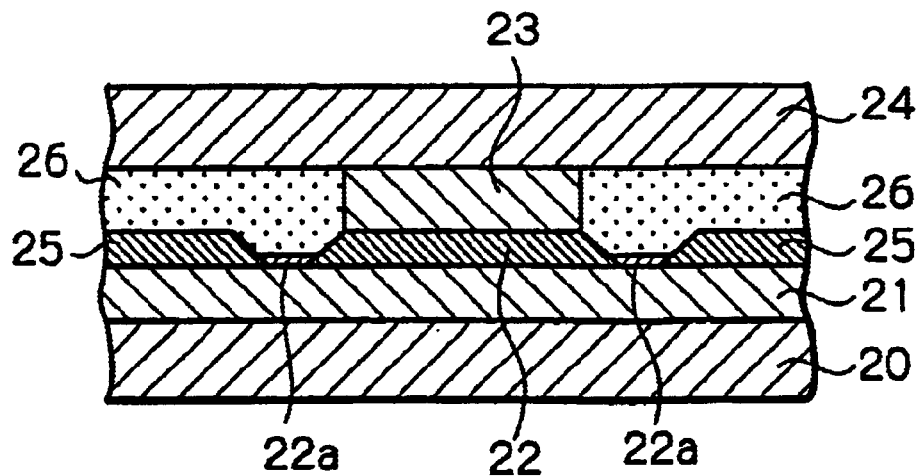
FIG. 2 already disclosed shows a sectional view illustrating a TMR element or a CPP-GMR element with a conventional structure seen from a direction of ABS.
Figure 3:
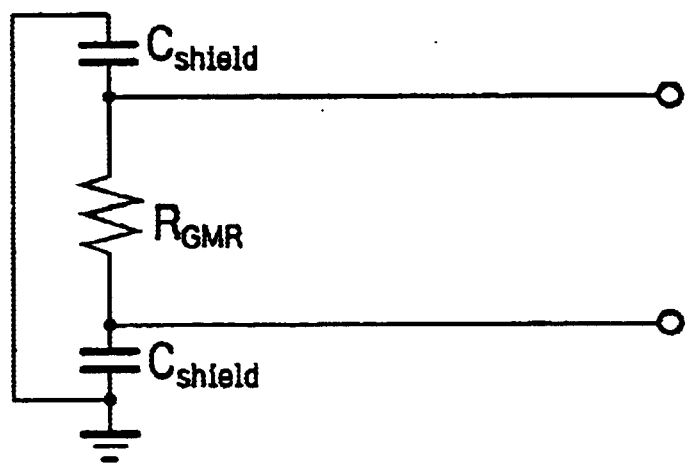
FIG. 3 already disclosed shows an equivalent circuit diagram of the CIP-GMR element.
Figure 4:
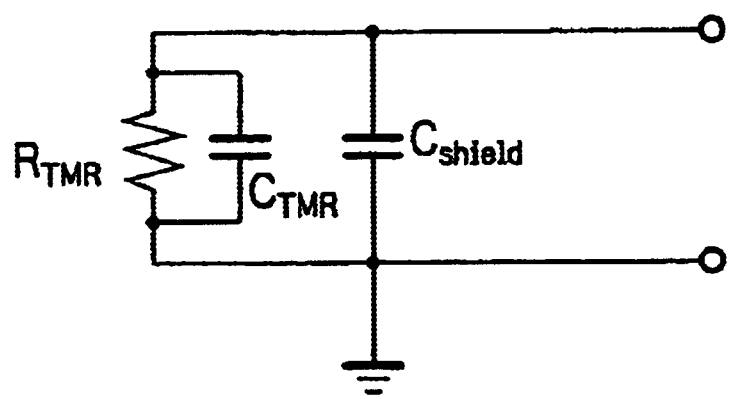
FIG. 4 already disclosed shows an equivalent circuit diagram of the TMR element or the CPP-GMR element.
Figure 5:
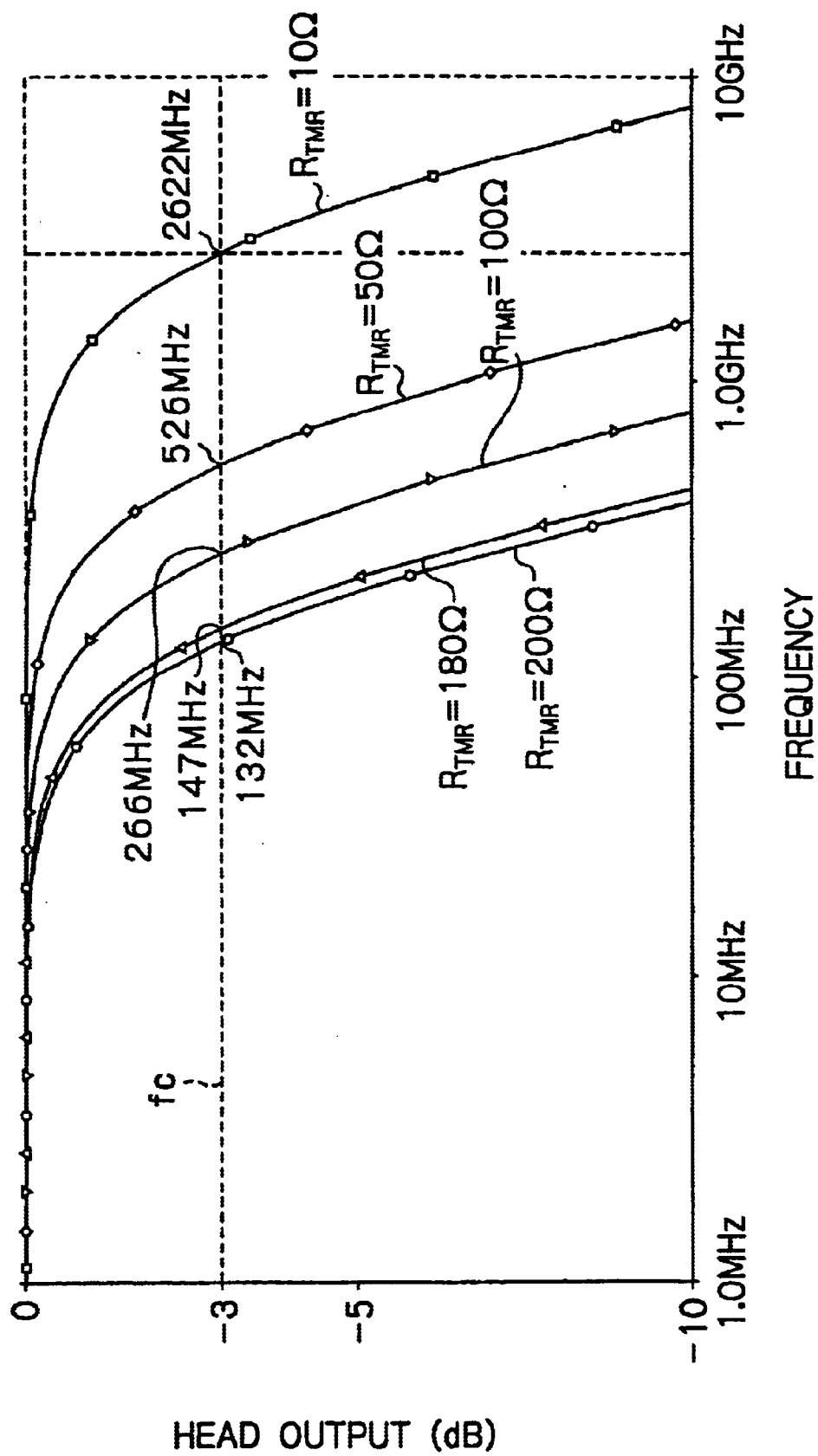
FIG. 5 already disclosed illustrates an attenuation versus frequency characteristic when the capacitance $C_{shield}$ between the shield layers in the equivalent circuit of FIG. 4 is 6 pF.
Figure 6:
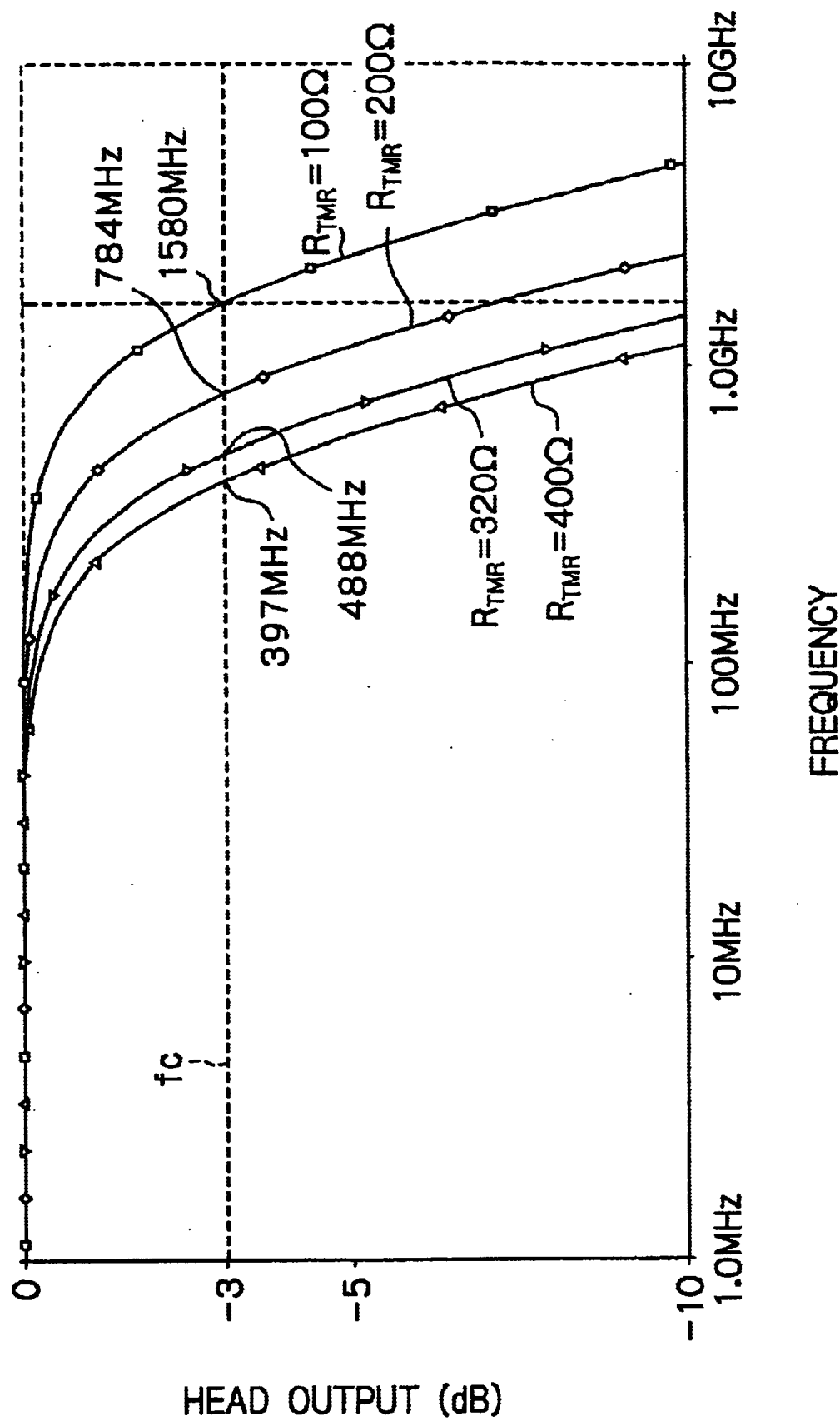
FIG. 6 already disclosed illustrates an attenuation versus frequency characteristic when the capacitance $C_{shield}$ between the shield layers in the equivalent circuit of FIG. 4 is 1 pF.
Figure 7A:
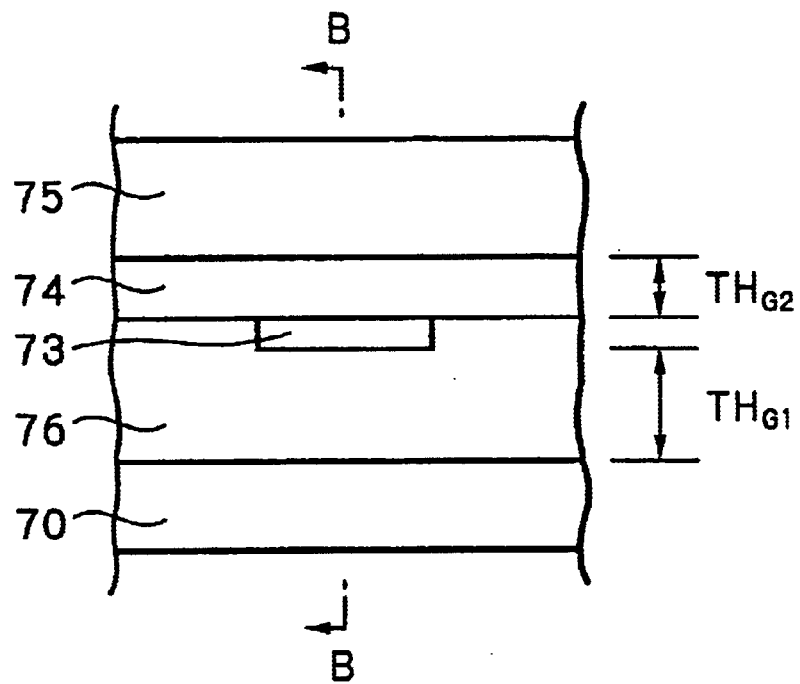
FIG. 7a shows a plane view schematically illustrating, as a preferred embodiment according to the present invention, a TMR thin-film magnetic head seen from ABS.
Figure 7B:
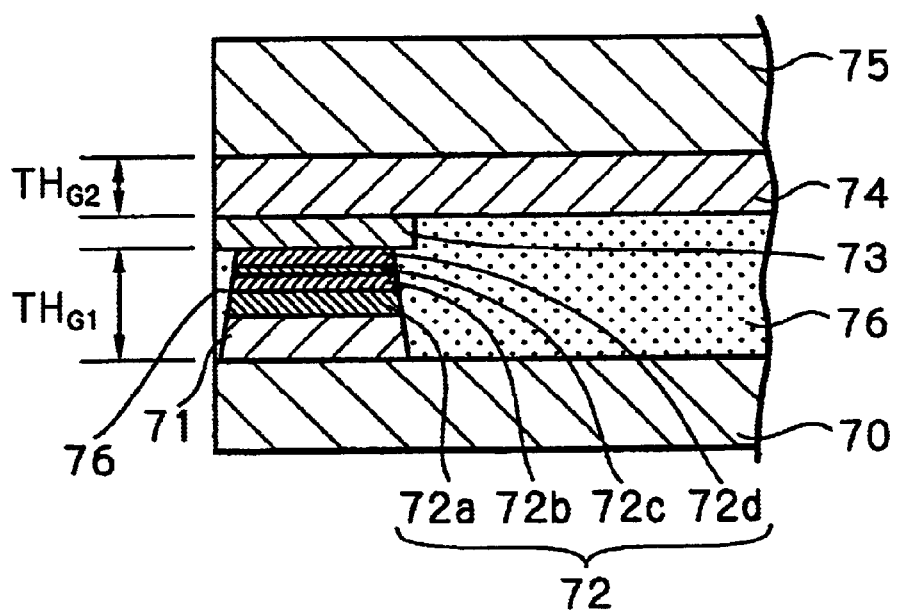

FIG. 7a schematically illustrates a TMR thin-film magnetic head seen from ABS as a preferred embodiment according to the present invention, and FIG. 7b illustrates a B—B line section of FIG. 7a. In these figures, layers under a bottom surface of a lower shield layer and layers laminated on an upper surface of an upper shield layer are omitted.

Referring to these figures, reference numeral 70 denotes a lower shield layer also serving as an electrode, laminated on a substrate, not shown, 71 denotes a lower gap layer serving also as an electrode, made of a nonmagnetic electrically conductive material, that is laminated on the lower shield layer 70 and is electrically connected with the lower shield layer 70, 72 denotes a TMR multilayer laminated on the lower gap layer 71 and patterned, 73 denotes a flux guide layer laminated at least on a free layer 72d of the TMR multilayer 72 and provided with a top end exposed at ABS, 74 denotes an upper gap layer also serving as an electrode, made of a nonmagnetic electrically conductive material, this upper gap layer being laminated on the flux guide layer 73 and the TMR multilayer 72, 75 denotes an upper shield layer also serving as an electrode, that is laminated on the upper gap layer 74 and is electrically connected with the upper gap layer 74, 76 denotes an insulation gap layer made of an insulating material, that is formed between the lower shield layer 70 and the upper gap layer 74 and outside of the TMR multilayer 72 and the flux guide layer 73, respectively.

The TMR multilayer 72 has a multi-layered structure including at least essential layers such as an anti-ferromagnetic thin-film layer 72a, a lower ferromagnetic thin-film layer (pinned layer) 72b, a tunnel barrier layer 72c and an upper ferromagnetic thin-film layer (free layer) 72d.

The upper ferromagnetic thin-film layer (free layer) 72d is formed basically such that the direction of magnetization freely changes depending upon an applied external magnetic field and magnetically coupled with the flux guide layer 73. The lower ferromagnetic thin-film layer (pinned layer) 72b is formed such that the direction of magnetization is fixed to a desired orientation according to an exchange coupling bias magnetic field between this lower ferromagnetic thin-film layer 72b and the anti-ferromagnetic thin-film layer 72a.

In FIGS. 7a and 7b, in order to simplify explanation, illustration of hard bias layers for performing magnetic domain control of the upper ferromagnetic thin-film layer (free layer) 72d of the TMR multilayer 72 are omitted.

The lower shield layer 70 and the upper shield layer 75 are formed in a single layer structure or a multilayer structure of, for example, NiFe (permalloy), sendust, CoFe, CoFeNi or CoZrNb. A film thickness is in the range of 0.5 to 4 μm, preferably 1 to 3 μm.

The lower gap layer 71 and the upper gap layer 74 are made of a nonmagnetic electrically conductive material such as Ta, Cu, Al, Ag, Au, Ti, TiW, Rh, Cr, In, Ir, Mg, Ru, W, Zn, PtMn or RuRhMn, or alloys of these materials. A film thickness is in the range of 5 to 70 nm, preferably 10 to 50 nm.

The lower ferromagnetic thin-film layer (pinned layer) 72b and the upper ferromagnetic thin-film layer (free layer) 72d of the TMR multilayer 72 are preferably made of a high spin polarization material, and are formed in a single layer structure or a multilayer structure of, for example, Fe, Co, Ni, CoFe, NiFe, CoZrNb or CoFeNi. The lower ferromagnetic thin-film layer (pinned layer) 72b has a thickness in the range of 1 to 10 nm, preferably 2 to 5 nm. Too large thickness of the pinned layer 72b weakens the exchange coupling bias magnetic field between this layer and the anti-ferromagnetic thin-film layer 72a, and too small thickness reduces TMR ratio. A thickness of the upper ferromagnetic thin-film layer (free layer) 72d is in the range of 2 to 50 nm, preferably 4 to 30 nm. If the thickness of the free layer 72d is too large, the output of the head decreases and becomes unstable due to, for example, Barkhausen noise. If the thickness is too small, the output decreases due to the deterioration of TMR effect.

The tunnel barrier layer 72c of the TMR multilayer 72 is made of, for example, $Al_2O_3$, NiO, GdO, MgO, $Ta_2O_5$, $MoO_2$, $TiO_2$ or $WO_2$. A thickness of the tunnel barrier layer 72c is in the range of about 0.5 to 2 nm. In order to make a low-resistance element, the thickness of the tunnel barrier layer 72c should be as small as possible. However, too thin layer is not desirable because it may cause pinholes which in turn cause leakage current.

The anti-ferromagnetic thin-film layer 72a of the TMR multilayer 72 is made of, for example, PtMn or RuRhMn but other common anti-ferromagnetic materials may be used. A thickness is in the range of about 6 to 30 nm.

The flux guide layer 73 is magnetically coupled with the upper ferromagnetic thin-film layer (free layer) 72d and Ad the top end of the flux guide layer 73 is exposed at ABS. Thus, magnetic field from the record medium easily passes through the flux guide layer 73 and applied to the upper ferromagnetic thin-film layer (free layer) 72d. Namely, in this embodiment, exposed is only the top end of the flux guide layer 73 and the TMR multilayer 72 can be retracted from ABS. As a result, no electrical short circuit will be occurred in the tunnel barrier layer 72c during or after the polishing process for controlling the MR height.

The insulation gap layer 76 is usually made of $Al_2O_3$.

An important aspect of this embodiment is to thicken the lower gap layer 71 laminated under the TMR multilayer 72 so that a film thickness $TH_{G1}$ of the insulation gap layer 76, namely a thickness of the insulation gap layer 76 from the bottom surface of the flux guide layer 73 as shown in FIG. 7b in this embodiment is larger than a film thickness $TH_{G2}$ of the upper gap layer 74. Since the thickness of the insulation gap layer 76 increases, a distance between the lower shield layer 70 and the upper gap layer 75 becomes large. As a result, the capacitance $C_{shield}$ between the lower and upper shield layers 70 and 75 is reduced to extremely improve the frequency characteristics of the thin-film magnetic head.

In this configuration, if a ratio of the film thickness $TH_{G1}$ of the insulation gap layer 76 from the bottom surface of the flux guide layer 73 with respect to the film thickness $TH_{G2}$ of the upper gap layer 74 ($TH_{G2}/TH_{G2}$) is set to 1/1 as is the conventional art, the capacitance $C_{shield}$ between the lower shield layer 70 and the upper shield layer 75 becomes $C_{shield}$=10.2 pF and the cut-off frequency fc becomes fc=120 MHz. In this case, the resistance $R_{HGA}$ of the TMR head including the leads is $R_{HGA}$=130 Ω. The measured values and calculated values of the capacitance $C_{shield}$ and the cut-off frequency fc are in fairly good agreement. For example, the cut-off frequency fc can be calculated from fc=1/($2\pi R_{HGA} C_{shield}$).

If a ratio $TH_{G2}/TH_{G1}$ is set to 1/1.53, the frequency characteristics of the thin-film magnetic head can be greatly improved as the capacitance $C_{shield}$ between the lower and upper shield layers 70 and 75 becomes $C_{shield}$=9.2 pF and the cut-off frequency fc becomes fc=133 MHz.

If a ratio $TH_{G2}/TH_{G1}$ is set to 1/3.95, the frequency characteristics of the thin-film magnetic head can be greatly improved as the capacitance $C_{shield}$ between the lower and upper shield layers 70 and 75 becomes $C_{shield}$=7.6 pF and the cut-off frequency fc becomes fc=161 MHz.

Figure 8:
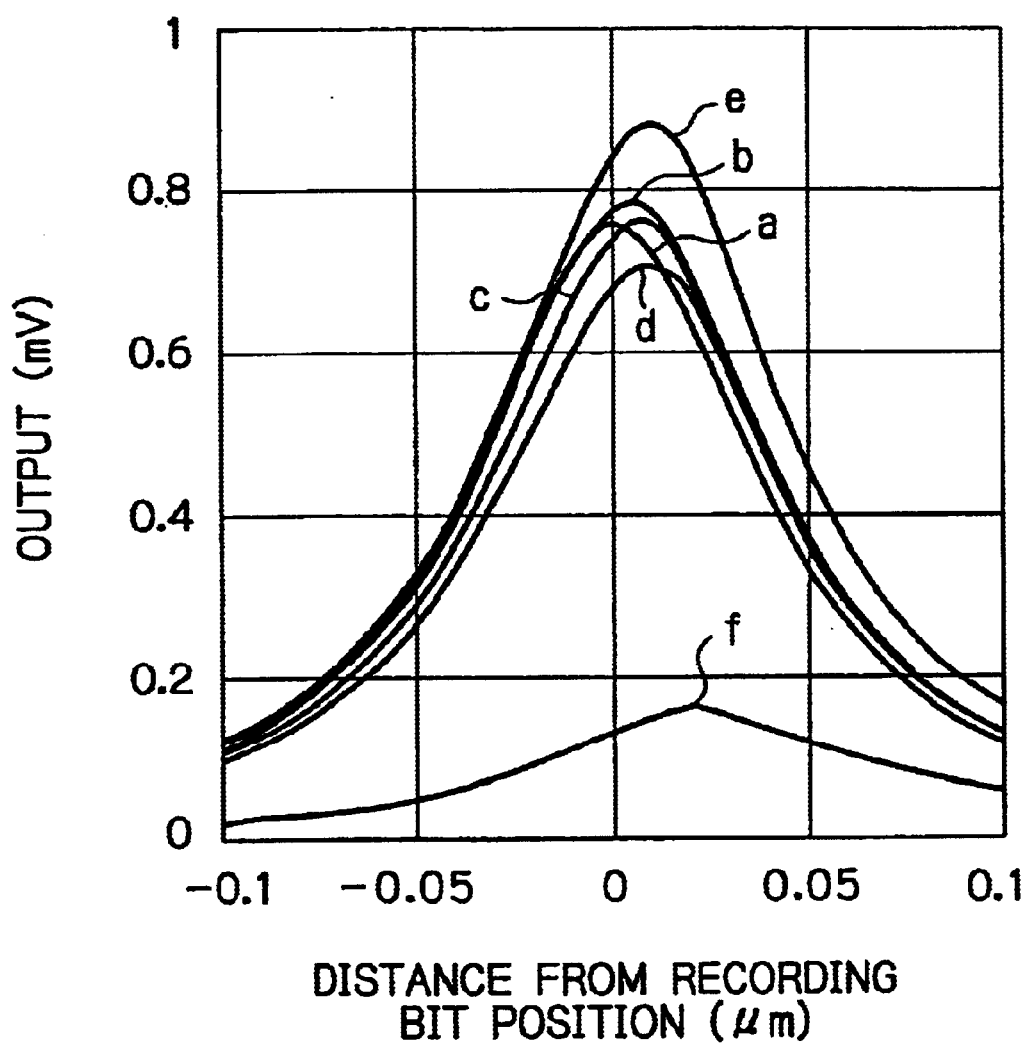
FIG. 8 illustrates measured characteristics of head output with respect to head distance from a recording bit position on a recording medium in actually fabricated TMR heads with different values of $TH_{G2}/TH_{G1}$.

FIG. 8 illustrates measured characteristics of head output with respect to head distance from a recording bit position on a recording medium in actually fabricated TMR heads with different ratios of $TH_{G2}/TH_{G1}$.

Each actually fabricated TMR head sample had TMR multilayer 72 of a laminated structure of NiCr (3 nm) as an under layer, PtMn (15 nm) as an anti-ferromagnetic thin-film layer, CoFe (1.5 nm)/Ru (0.8 nm)/CoFe (1.5 nm) as a lower ferromagnetic thin-film layer (pinned layer), $Al_2O_3$ (0.7 nm) as a tunnel barrier layer, and CoFe (2 nm)/NiFe (2 nm) as an upper ferromagnetic thin-film layer (free layer), all of which were sequentially laminated in this order. The total thickness of this layers was 27 nm. The flux guide layer 73 was made of $Ni_{80}Fe_{10}Ta_{10}$. The top end surface exposed at ABS, of the flux guide layer 73 had a height or thickness of 6 nm and a width of 130 nm. The length or depth from ABS of the flux guide layer 73 was 200 nm. The thickness of the lower shield layer 70 was 3.5 $\mu$m, and the thickness of the upper shield layer 75 was 2 $\mu$m. With respect to the TMR multilayer, a dimension was 0.16×0.16 $\mu m^2$, TMR was 10%, RA was 8 $\Omega\mu m^2$, the distance between the shield layers was 51 nm, and the resistance of TMR head including leads was $R_{HGA}$= 313$\Omega$. The sense current flowed during the measurement was 1 mA.

Table 1 indicates ratios $TH_{G2}/TH_{G1}$ and judgments of good/no good based upon the measured results with respect to each of the TMR head samples a to f.

TABLE 1

| Samples | $TH_{G1}$ (nm) | $TH_{G2}$ (nm) | $TH_{G1}/TH_{G2}$ | Good/No good |
|---|---|---|---|---|
| a | 22.5 | 22.5 | 1/1 | Good |
| b | 27.5 | 17.5 | 1/1.75 | Good |
| c | 32.5 | 12.5 | 1/2.6 | Good |
| d | 37.5 | 7.7 | 1/5 | No good |
| e | 42.5 | 2.5 | 1/17 | No good |
| f | 45.0 | 0.0 | 0 | No good |

From Table 1 and FIG. 8, following facts are revealed. The sample f having no upper gap layer 74 and thus presenting a ratio of $TH_{G2}/TH_{G1}$=0 (ratio of the film thickness $TH_{G1}$ of the insulation gap layer 76 from the bottom surface of the flux guide layer 73 with respect to the film thickness $TH_{G2}$ of the upper gap layer 74) is out of bounds for discussion. In the sample d with a ratio of $TH_{G2}/TH_{G1}$= 1/5, deterioration in the output characteristics is occurred. Also, in the sample d with a ratio of $TH_{G2}/TH_{G1}$=1/5 and the sample e with a ratio of $TH_{G2}/TH_{G1}$=1/17, distortion arose in their output wave shapes and their PW50 values become large. Therefore, the samples d, e and f are undesirable in terms of their output characteristics even though they have small capacitances $C_{shield}$ between the shield layers by thickening the insulation layers 76. Therefore, if the ratio of $TH_{G2}/TH_{G1}$ is more than 1/5, a capacitances $C_{shield}$ between the shield layers can be reduced to improve the frequency characteristic of the TMR head greatly without deteriorating the output characteristics of the head.

Figure 9A:
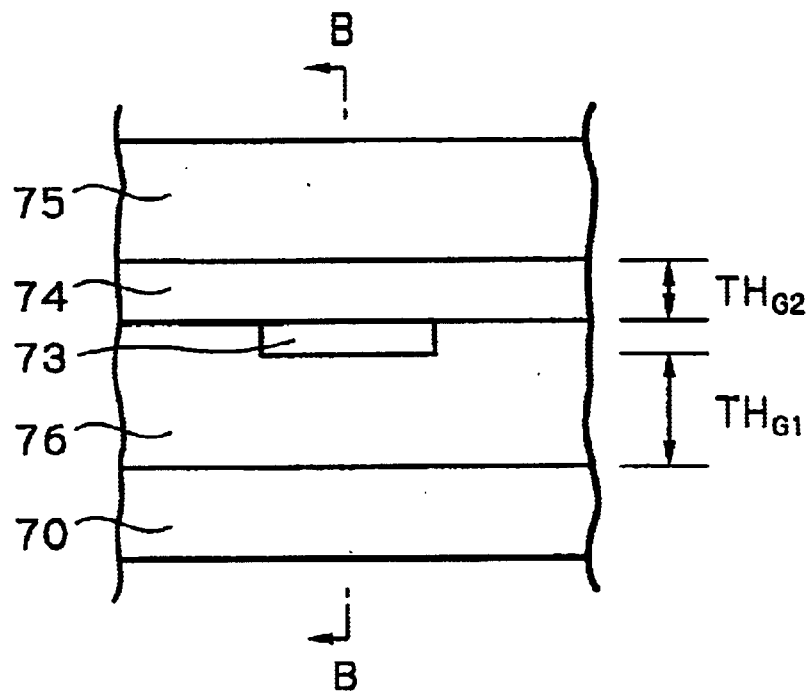
FIG. 9a shows a plane view schematically illustrating, as another embodiment according to the present invention, a TMR thin-film magnetic head seen from ABS.
Figure 9B:
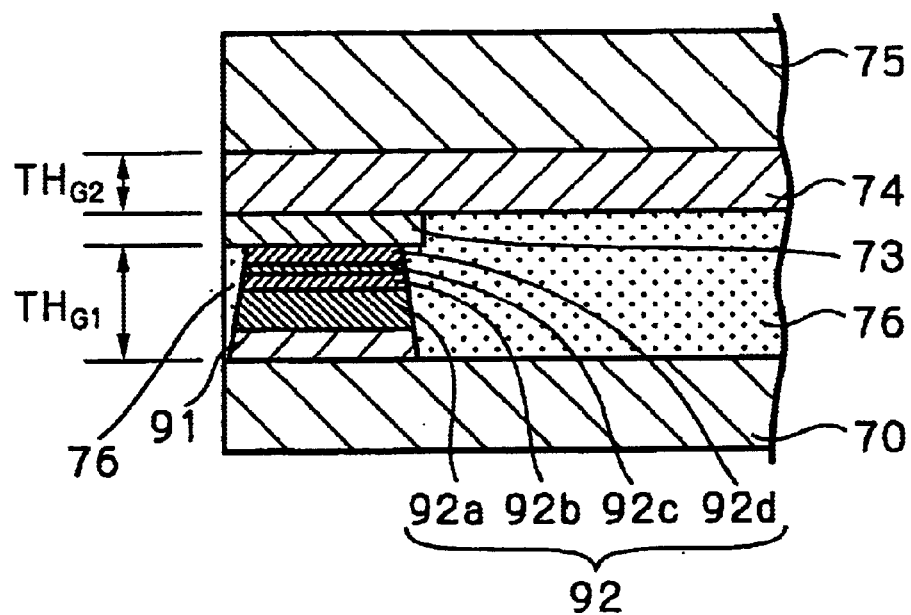
FIG. 9b shows a B—B line sectional view of FIG. 9b.

FIG. 9a schematically illustrates a TMR thin-film magnetic head seen from ABS as another embodiment according to the present invention, and FIG. 9b illustrates a B—B line section of FIG. 9a. In these figures, layers under a bottom surface of a lower shield layer and layers laminated on an upper surface of an upper shield layer are omitted.

In this embodiment, a film thickness of a TMR multilayer 92 itself is made large without thickening a lower gap layer 91 laminated under the TMR multilayer 92 so that a film thickness $TH_{G1}$ of the insulation gap layer 76, namely a thickness of the insulation gap layer 76 from the bottom surface of the flux guide layer 73 as shown in FIG. 9b in this embodiment is larger than a film thickness $TH_{G2}$ of the upper gap layer 74. Since the thickness of the insulation gap layer 76 increases, a distance between the lower shield layer 70 and the upper gap layer 75 becomes large. As a result, the capacitance $C_{shield}$ between the lower and upper shield layers 70 and 75 is reduced to extremely improve the frequency characteristics of the thin-film magnetic head. The other structure of this embodiment of FIGS. 9a and 9b is exactly the same as that of the embodiment of FIGS. 7a and 7b. Thus, in these figures, elements similar to those in FIGS. 7a and 7b are given the same reference numerals.

The TMR head of this embodiment has the TMR multilayer 92 of multi-layered structure with basic layers of an anti-ferromagnetic thin-film layer 92a, a lower ferromagnetic thin-film layer (pinned layer) 92b, a tunnel barrier layer 92c, and an upper ferromagnetic thin-film layer (free layer) 92d, all of which are sequentially laminated in this order on the lower gap layer 91. The anti-ferromagnetic thin-film layer 92a has a larger thickness than that of the anti-ferromagnetic thin-film layer 72a in the embodiment of FIGS. 7a and 7b, and thus the total thickness of the TMR multilayer 92 is increased. Configurations of the lower ferromagnetic thin-film layer (pinned layer) 92b, the tunnel barrier layer 92c and the upper ferromagnetic thin-film layer (free layer) 92d are the same of those of the lower ferromagnetic thin-film layer (pinned layer) 72b, the tunnel barrier layer 72c and the upper ferromagnetic thin-film layer (free layer) 72d, respectively.

The other configuration, material, film thickness, effects and advantages, and modifications in this embodiment are the same as those in the embodiment of FIGS. 7a and 7b.

As for modifications of the embodiments shown in FIGS. 7a and 7b and FIGS. 9a and 9b, a CPP-GMR multilayer in which a sense current flows in a direction perpendicular to the surfaces of layers may be used instead the TMR multilayer.

In the aforementioned embodiments and modifications, if a lead conductor for the MR element and a via hole conductor having the same potential as that of the upper shield layer are patterned so that an area of them, opposing the lower shield layer or the lower gap layer becomes small, the capacitance $C_{shield}$ between the shield layers is reduced to improve the frequency characteristics of the thin-film magnetic head.

In the aforementioned embodiments, the insulation gap layer 76 is made of $Al_2O_3$. In modification, however, a part of or entirety of this insulation gap layer may be made of an insulation materials such as $Si_3N_4$, Co-$\gamma Fe_2O_3$ (hematite) or $SiO_2$ that has a lower dielectric constant than $Al_2O_3$, so that the capacitance $C_{shield}$ between the shield layers is further reduced to improve the frequency characteristics of the thin-film magnetic head.

Further, a distance between the lower shield layer and the upper shield layer can be substantially increased from that in the aforementioned embodiments to further reduce the capacitance $C_{shield}$ between the shield layers and thus to improve the frequency characteristic of the thin-film magnetic head. This can be realized by removing the upper surface portion of the lower shield layer 70 to form a recess within a region where the TMR multilayer 72 or 92 or the CPP-GMR multilayer is absent and by filling the recess with an insulation layer, or by partially adding an insulation layer on the insulation gap layer 76.

While the aforementioned embodiments have been described with respect to two types of TMR multilayer or CPP-GMR multilayer, the present invention can be applied to TMR elements or CPP-GMR elements with any structures.

Many widely different embodiments of the present invention may be constructed without departing from the spirit and scope of the present invention. It should be understood that the present invention is not limited to the specific embodiments described in the specification, except as defined in the appended claims.

What is claimed is:

1. A magnetoresistive effect thin-film magnetic head, comprising:
   a lower shield layer;
   a magnetoresistive effect multilayer laminated on said lower shield layer, in said magnetoresistive effect multilayer, a current flowing in a direction perpendicular to surfaces of layers of said magnetoresistive effect multilayer;
   a flux guide layer between said magnetoresistive effect multilayer and an upper gap layer, said upper gap layer made of a nonmagnetic electrically conductive material and laminated on said flux guide layer;
   an insulation gap layer made of insulation material and formed between said lower shield layer and said upper gap layer, a thickness of said insulation gap layer being larger than that of said upper gap layer; and
   an upper shield layer laminated on said upper gap layer.

2. The magnetoresistive effect thin-film magnetic head as claimed in claim 1, wherein said head further comprises a lower gap layer made of a nonmagnetic electrically conductive material and formed under said magnetoresistive effect multilayer, so that the thickness of said insulation gap layer becomes larger than that of said upper gap layer.

3. The magnetoresistive effect thin-film magnetic head as claimed in claim 1, wherein said magnetoresistive effect multilayer has a thickness so that the thickness of said insulation gap layer becomes larger than that of said upper gap layer.

4. The magnetoresistive effect thin-film magnetic head as claimed in claim 3, wherein said magnetoresistive effect multilayer includes an anti-ferromagnetic layer with a thickness so that the thickness of said insulation gap layer becomes larger than that of said upper gap layer.

5. The magnetoresistive effect thin-film magnetic head as claimed in claim 1, wherein a ratio $TH_{G2}/TH_{G1}$ of a thickness $THG_2$ of said upper gap layer and a thickness $TH_{G1}$ of said insulation gap layer is more than 1/5.

6. The magnetoresistive effect thin-film magnetic head as claimed in claim 1, wherein said magnetoresistive effect multilayer is a tunnel magnetoresistive effect multilayer including a tunnel barrier layer and a pair of ferromagnetic thin-film layers between which said tunnel barrier layer is sandwiched.

7. The magnetoresistive effect thin-film magnetic head as claimed in claim 1, wherein said magnetoresistive effect multilayer is a current perpendicular to the plane giant magnetoresistive effect multilayer including a nonmagnetic metal layer, and a pair of ferromagnetic thin-film layers between which said nonmagnetic metal layer is sandwiched.

8. A magnetoresistive effect thin-film magnetic head, comprising:
   a lower shield layer;
   a lower gap layer made of a nonmagnetic electrically conductive material and laminated on said lower shield layer;
   a magnetoresistive effect multilayer laminated on said lower gap layer, in said magnetoresistive effect multilayer, a current flowing in a direction perpendicular to surfaces of layers of said magnetoresistive effect multilayer;
   a flux guide layer between said magnetoresistive effect multilayer and an upper gap layer, said upper gap layer made of a nonmagnetic electrically conductive material and laminated on said flux guide layer;
   an insulation gap layer made of an insulation material and formed between said lower shield layer and said upper gap layer, a thickness of said insulation gap layer being larger than that of said upper gap layer; and
   an upper shield layer laminated on said upper gap layer.

9. The magnetoresistive effect thin-film magnetic head as claimed in claim 8, wherein said head further comprises a lower gap layer made of a nonmagnetic electrically conductive material and formed under said magnetoresistive effect multilayer, so that the thickness of said insulation gap layer becomes larger than that of said upper gap layer.

10. The magnetoresistive effect thin-film magnetic head as claimed in claim 8, wherein said magnetoresistive effect multilayer has a thickness so that the thickness of said insulation gap layer becomes larger than that of said upper gap layer.

11. The magnetoresistive effect thin-film magnetic head as claimed in claim 10, wherein said magnetoresistive effect multilayer includes an anti-ferromagnetic layer with a thickness so that the thickness of said insulation gap layer becomes larger than that of said upper gap layer.

12. The magnetoresistive effect thin-film magnetic head as claimed in claim 8, wherein a ratio $TH_{G2}/TH_{G1}$ of a thickness $Th_{G2}$ of said upper gap layer and a thickness $TH_{G1}$ of said insulation gap layer is more than 1/5.

13. The magnetoresistive effect thin-film magnetic head as claimed in claim 8, wherein said magnetoresistive effect multilayer is a tunnel magnetoresistive effect multilayer including a tunnel barrier layer and a pair of ferromagnetic thin-film layers between which said tunnel barrier layer is sandwiched.

14. The magnetoresistive effect thin-film magnetic head as claimed in claim 8, wherein said magnetoresistive effect multilayer is a current perpendicular to the plane giant magnetoresistive effect multilayer including a nonmagnetic metal layer, and a pair of ferromagnetic thin-film layers between which said nonmagnetic metal layer is sandwiched.

* * * * *